United States Patent
Vaara

(10) Patent No.: US 6,285,884 B1
(45) Date of Patent: Sep. 4, 2001

(54) METHOD AND ARRANGEMENT FOR MAKING A HANDOVER DECISION IN A MOBILE COMMUNICATION SYSTEM

(75) Inventor: Tomi Vaara, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/117,486
(22) PCT Filed: Feb. 18, 1997
(86) PCT No.: PCT/FI97/00101
§ 371 Date: Oct. 8, 1998
§ 102(e) Date: Oct. 8, 1998
(87) PCT Pub. No.: WO97/31496
PCT Pub. Date: Aug. 28, 1997

(30) Foreign Application Priority Data

Feb. 20, 1996 (FI) .......................................... 960766

(51) Int. Cl.⁷ ..................................................... H04Q 7/20
(52) U.S. Cl. ........................... 455/441; 455/436; 455/443; 455/444
(58) Field of Search ..................................... 455/436, 441, 455/443, 444, 437; 342/104, 109, 107; 379/60

(56) References Cited

U.S. PATENT DOCUMENTS

| | | | |
|---|---|---|---|
| 5,396,253 | * | 3/1995 | Chia ........................................ 342/104 |
| 5,396,645 | * | 3/1995 | Huff ........................................ 455/33.4 |
| 5,450,473 | * | 9/1995 | Shiotsuki et al. ........................ 379/60 |
| 5,513,380 | * | 4/1996 | Ivanov et al. ........................ 455/33.2 |
| 5,548,806 | * | 8/1996 | Yamaguchi et al. ................ 455/33.1 |
| 5,574,971 | * | 11/1996 | Aihara ................................... 455/33.1 |
| 5,722,072 | * | 2/1998 | Chrichton et al. .................... 455/437 |
| 5,787,348 | * | 7/1998 | Willey et al. ......................... 455/441 |
| 5,907,808 | * | 5/1999 | Vaara et al. .......................... 455/441 |
| 5,913,168 | * | 6/1999 | Moreau et al. ....................... 455/441 |

FOREIGN PATENT DOCUMENTS

| | | |
|---|---|---|
| 0 526 436 | 2/1993 | (EP) . |
| 0 589 278 | 3/1994 | (EP) . |
| 2 242 806 | 10/1991 | (GB) . |
| 2 284 321 | 5/1995 | (GB) . |
| 2 284 725 | 6/1995 | (GB) . |
| 2 287 858 | 9/1995 | (GB) . |
| WO 95/28813 | 10/1995 | (WO) . |

* cited by examiner

Primary Examiner—Curtis Kuntz
Assistant Examiner—Barry Taylor
(74) Attorney, Agent, or Firm—Altera Law Group, LLC

(57) ABSTRACT

The invention relates to a method and arrangement for making a handover decision in a mobile communication system of multilayer radio coverage, which comprises measuring at a mobile station (MS) a radio signal transmitted by a base station (BTS) of a microcell, and reporting the measurement results at substantially regular intervals. The invention is characterized by determining a relative speed for the mobile station on the basis of the number and classification of the measurement results received at substantially regular intervals. Mobile stations moving at a speed slower than the relative speed are defined as slow moving and commanded to register in the base station of a suitable microcell (A, B, C).

11 Claims, 4 Drawing Sheets

METHOD AND ARRANGEMENT FOR MAKING A HANDOVER DECISION IN A MOBILE COMMUNICATION SYSTEM

FIELD OF THE INVENTION

The invention relates to a method and arrangement for making a handover decision in a mobile communication system comprising at least one microcell the coverage area of which is at least mainly located within the coverage area of another cell. The method comprises measuring at a mobile station a radio signal transmitted by a base station of a microcell, and reporting the measurement results at substantially regular intervals, and commanding mobile stations defined as slow moving mobile stations to switch to the base station of a suitable microcell.

BACKGROUND OF THE INVENTION

In cellular mobile communication systems, a radio coverage area is implemented with different cell sizes and often even with multiple cell layers. A cell with a very small coverage area, i.e. a microcell, is used for instance in areas which are difficult to cover or which require a great deal of subscriber capacity. A large coverage area is implemented with a macrocell, which often completely covers the geographical area of one or more microcells. In a multilayer radio coverage, macrocells represent coverage areas of a higher level and microcells those of a lower level. The mobile station may move from one cell to another and register with a new base station. When the mobile station has a call in progress, switching the call (handover) to the new cell is also involved.

FIG. 1 of the accompanying drawings shows an example of a two-layer radio coverage in a mobile communication system. The simplified cell areas in FIG. 1 illustrate the areas in which the base station of each cell can offer a sufficient signal level to the mobile station. In FIG. 1, a large macrocell M covers the areas of smaller microcells A, B and C. A mobile station located in position x in cell A, for example, can in principle be served by the base station of either the macrocell M or the microcell A.

In radio networks where multilayer radio coverage is employed, it is advantageous to utilize the possibilities offered by the different cell layers by commanding mobile stations, on the basis of a certain classification, to register with the most suitable base station, avoiding however unnecessary handovers. One such classification criterion is the speed of a mobile station in a mobile communication network with one or more microcells whose coverage areas are located entirely within another cell, typically a macrocell. It is known that slow moving mobile stations are advantageously handed over to a microcell base station to prevent them from unnecessarily loading the base station of the macrocell. On the other hand, it is advantageous to hand fast moving mobile stations over to the base station of the macrocell to prevent frequently recurring handovers and even to prevent calls from being lost when mobile stations move fast outside the coverage area of a microcell.

In the two-layer radio coverage illustrated in FIG. 1, fast moving mobile stations are kept under the base station of the macrocell M in order to prevent unnecessary handovers. Only the mobile stations defined as slow moving are handed over to the microcell (A, B or C) in whose area the mobile station is located.

FIG. 2 of the appended drawings is a block diagram illustrating the structure of the GSM mobile communication system by way of example in a simplified manner. The units shown in FIG. 2 are also included in other mobile communication networks, although they may have different names. A mobile station MS that is in standby or active mode is constantly registered with a base transceiver station BTS. A base station system BSS consists of a base station controller BSC and base transceiver stations BTS under its control. A plurality of base station controllers BSC usually operate under a mobile services switching centre MSC. An MSC transmits messages to other MSCs.

A mobile station MS continuously measures signals from the base stations BTS that are closest to its location for a possible handover. In the GSM mobile communication network, for example, an MS may simultaneously measure the signal level and/or quality of both the serving base station and up to 32 other base stations. The serving base station informs the mobile station of the neighbouring cells it should measure. The measurement results of each cell are identified on the basis of a base station identity code BSIC.

The mobile station MS sends the measuring results regularly as a report message through the serving base station BTS to the base station controller BSC. A report message contains the measurement results of the serving base station and up to six best neighbouring base stations. The base station controller BSC makes the decisions relating to handover. If the target cell is controlled by another BSC, the handover is performed under the control of the MSC. Handover decisions can also be made in a centralized manner in the MSC. If necessary, the BSC gives a handover command to the MS through the BTS. According to the GSM recommendations, the rate at which measurement results are reported is at least once a second. In most applications, the MS reports the measurement results at intervals of 480 ms.

European Patent Application No. 0 589 278 discloses a microcell/macrocell system. This system comprises measuring the time a mobile station moving in a macro cell remains within the coverage area of a microcell included in the macrocell. The system prevents fast moving mobile stations from being handed over to a microcell base station. Handover from the macrocell to a microcell is performed only if the mobile station is still within the coverage area of a microcell after a predetermined time from its arrival in the microcell area. If the mobile station has already left the coverage area of the microcell during this time, handover from the macrocell to the microcell will not be performed. The problem with this solution is that a handover from a macrocell to a microcell is made on the basis of an instantaneous location of the mobile station. The handover is affected only by the arrival of the mobile station in the coverage area of the microcell and by the location of the mobile station after a predetermined time from its arrival in the area. During this time, a fast moving mobile station may have left the area of the microcell and returned there, in which case the system performs a handover from the macrocell to the microcell. According to an embodiment of the system, the measurement of time is stopped if the mobile station leaves the microcell area and started again from the beginning when the mobile station returns to the microcell area. The problem with this embodiment is that the solution is based on instantaneous measurement results, which do not always fully correspond to the reality. The timer will be reset, for example, if the mobile station moves outside the coverage area of a microcell for a short while, or if a measurement result is erroneous/missing.

BRIEF DESCRIPTION OF THE INVENTION

The object of the present invention is to obviate the above-described problems caused in mobile communication networks of overlapping cell coverage when a handover decision is made on the basis of the speed of the mobile station. The new way of making a handover decision in a mobile communication system of multilayer radio coverage is achieved with a method of the invention, which is characterized by comprising determining a relative speed for the mobile station on the basis of the number and classification of the measurement results received at substantially regular intervals, and defining a mobile station (MS) as a slow moving mobile station, when the determined relative speed of said mobile station is lower than a predetermined relative speed.

The invention is based on the idea of determining when a mobile station has remained in the area of a microcell for a sufficiently long time either either continuously or in several periods—on the basis of the measurement results of a base station.

The invention also relates to an arrangement for making a handover decision in a mobile communication system of multilayer radio coverage. The arrangement is characterized in that the mobile communication system comprises first comparison means for classifying the measurement results received at substantially regular intervals for the base station of each microcell, counter means for determining a relative speed of the mobile station by counting the classified measurement results for the base station signal of each microcell on the basis of their number and classification, and second comparison means for comparing the relative speed of the mobile station with a pre-set threshold value, and when the threshold value is exceeded, defining the mobile station as a slow moving mobile station, means for commanding a mobile station defined as a slow moving mobile station to switch to the base station of a suitable microcell.

According to the method of the present invention, a decision on handing a mobile station over to the base station of a microcell is made on the basis of a variable representing the relative speed of the mobile station and the signal level and/or quality of the microcell base station. The base station signal of each microcell in the radio network is monitored independently of the other cells. The method comprises determining the relative speed of the mobile station in the area of a microcell on the basis of the number and classification of measurement results reported by the mobile station.

In the method of the invention, the measurement results of a base station signal reported by a mobile station at regular intervals are classified by comparing them with pre-set threshold levels for a base station signal. The relative speed of the mobile station is determined by counting the classified measurement results. For a handover decision, the value of the relative speed of the mobile station is compared with a pre-set threshold value. When the value of the relative speed exceeds the threshold value, it can be concluded that the mobile station is moving at a relatively slow speed and that the microcell in question can offer sufficient signal level and/or quality to the mobile station.

One advantage of such a method and arrangement for making a handover decision in a mobile communication system of multilayer radio coverage is that they allow the loading of the macrocell to be reduced.

A further advantage of the invention is that a handover decision is not based on a single measurement result. By monitoring the level and/or quality of a base station signal received by a mobile station for a long time, it can be ensured that the relative speed of the mobile station is determined within the area of the cell. A few short-term drops in the level and/or quality of the base station signal will not exclude the possibility of a handover.

BRIEF DESCRIPTION OF THE DRAWINGS

In the following, the invention will be described in greater detail with reference to the accompanying drawings, in which.

DETAILED DESCRIPTION OF THE INVENTION

Figure 2:
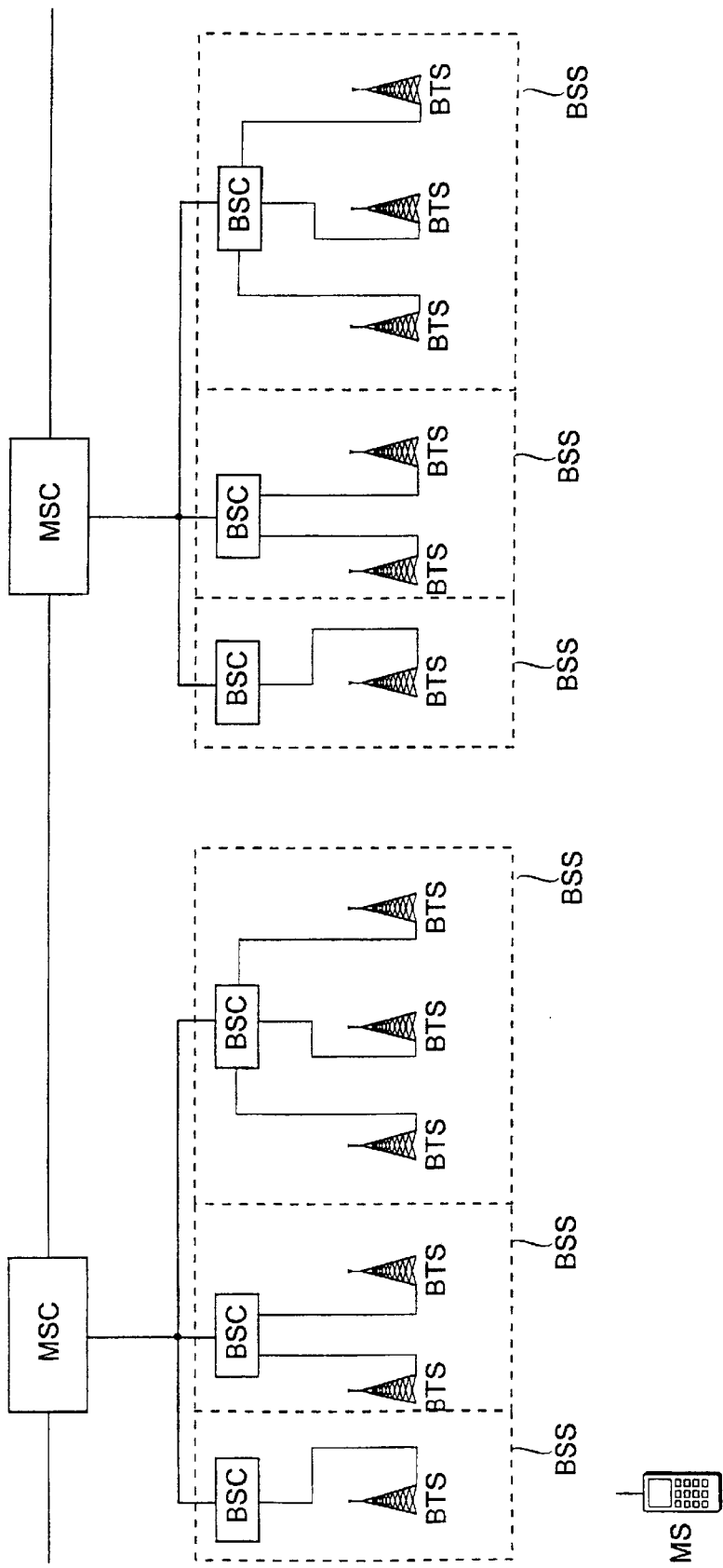
FIG. 2 is a block diagram of the structure of a mobile communication system.

The present invention can be applied in any cellular mobile communication system. In the following, the invention will be described in greater detail with reference, by way of example, to the pan-European digital mobile communication system GSM. FIG. 2 illustrates the above-described structure of a GSM network in a simplified manner. For a more accurate description of the GSM system, reference is made to the GSM recommendations and "The GSM System for Mobile Communications" by M. Mouly and M-B. Pautet, Palaiseau, France, 1992, ISBN: 2-9507190-0-7.

Figure 1:
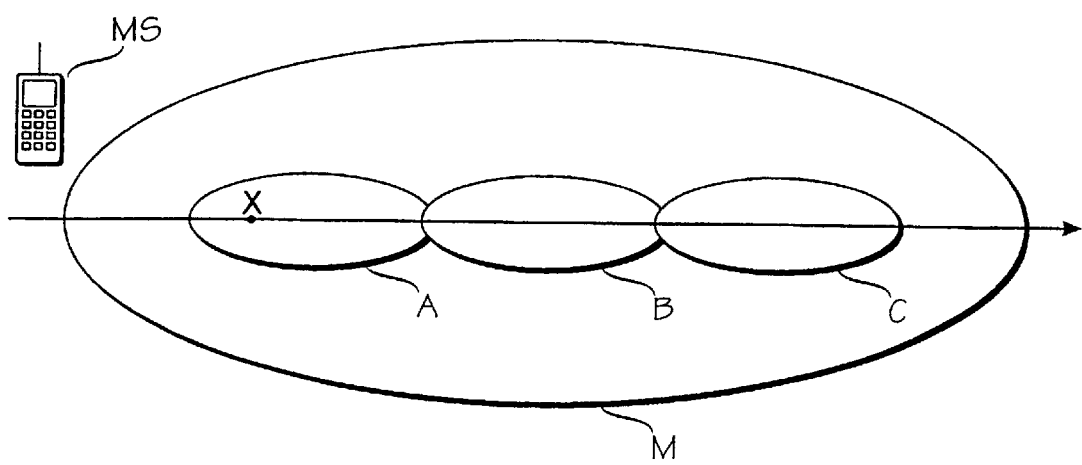
FIG. 1 illustrates two-layer radio coverage in a mobile communication system.

The method of the invention is particularly applicable to microcell/macrocell networks. FIG. 1 shows an example of a microcell/macrocell network having a two-layer radio coverage. The method is also suitable for use in other networks implemented with multilayer cell coverages, i.e. with more than two cell layers.

Figure 3:
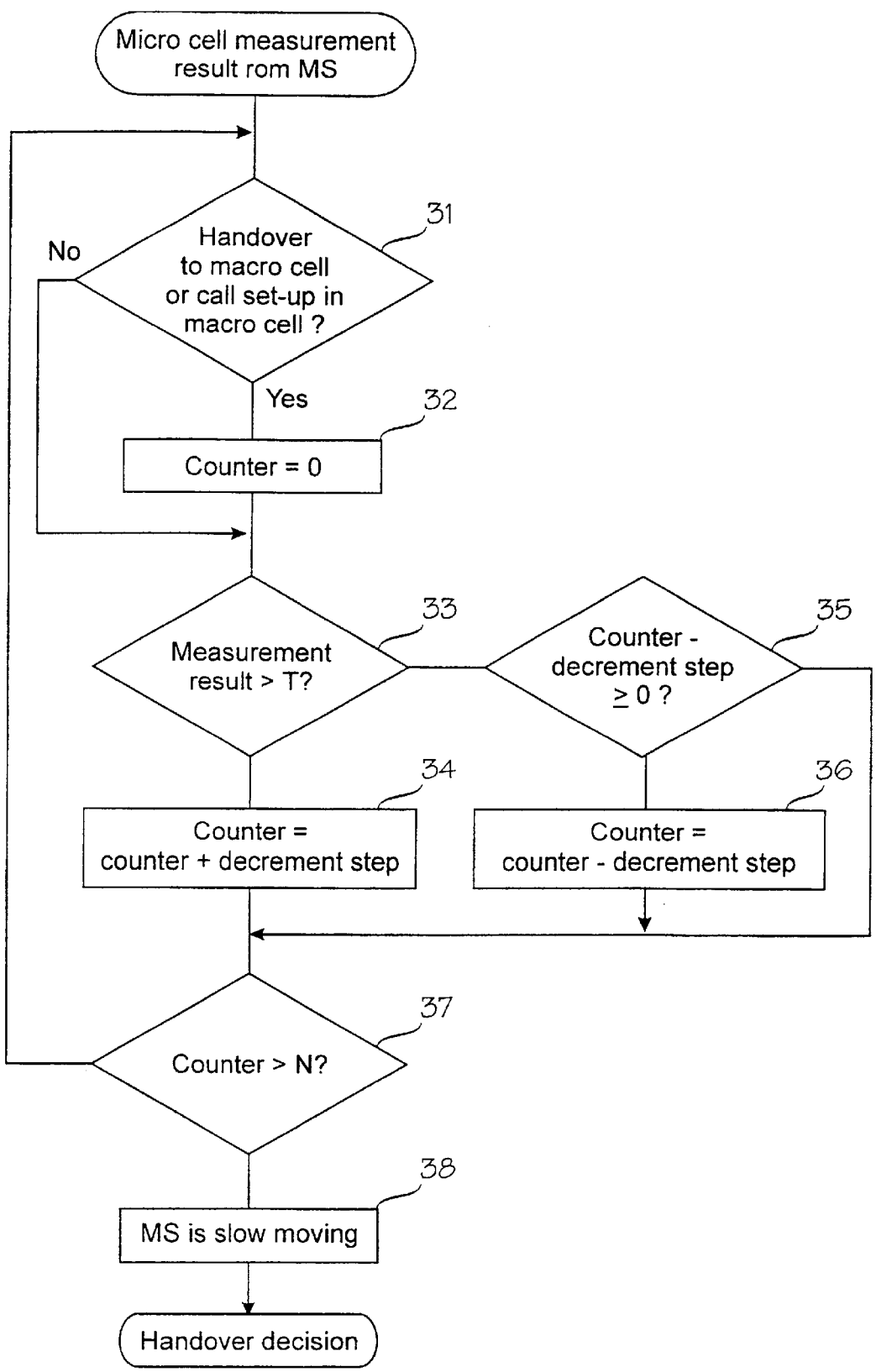
FIG. 3 is a flow chart of a preferred embodiment of the method of the invention.

In the following, the invention will be described in greater detail with reference to a preferred embodiment. In this embodiment, measurement results are classified into two classes by means of a threshold level T. FIG. 3 is a flow chart of a preferred embodiment of the method according to the invention.

The arrangement for carrying out the method of the invention is provided in connection with the network elements making handover decisions, preferably a base station controller BSC. The arrangement comprises comparison means and counting means, such as counters. A dedicated counter is associated with each microcell.

Figure 4:
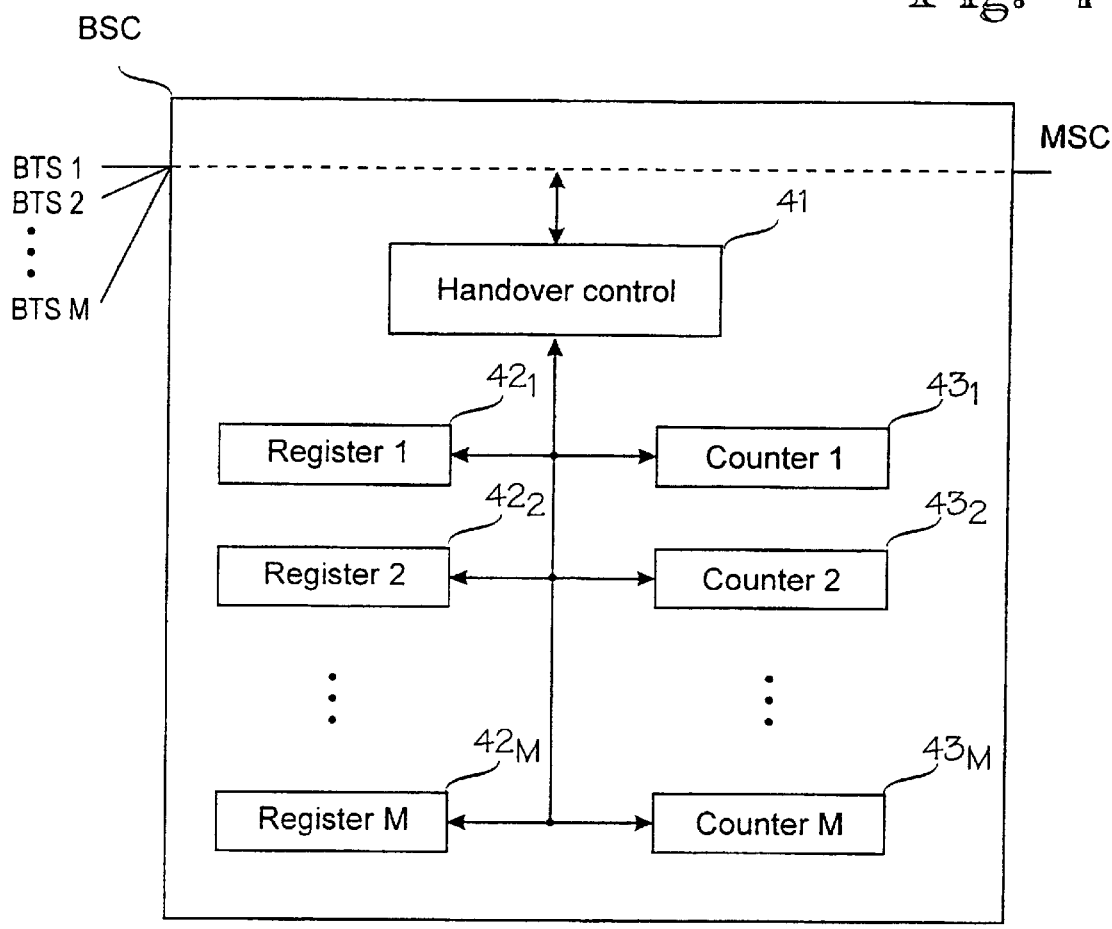
FIG. 4 is a block diagram of a base station controller implementing a preferred embodiment of the handover decision according to the invention.

In the following, with reference to FIG. 4, the preferred embodiment of the invention will be described in a case where the handover decision is made by the base station controller BSC. FIG. 4 is a block diagram of a BSC of the invention, illustrating only the components of the BSC that are relevant to the invention. For reasons of clarity, the arrangement is illustrated only with regard to monitoring one mobile station MS. The BSC of FIG. 4 is connected to a mobile services switching centre MSC and base stations BTS1–BTSM. The handover procedure is controlled by a handover control unit 41. Each base station BTS1–BTSM is associated with a dedicated register $42-42_M$ which contains the pre-set parameters for the respective base station: the threshold level T of measurement results, and the threshold value N of the counter. In addition, a dedicated counter $43-43_M$ which counts the relative speed of the mobile station is assigned for each base station BTS1–BTSM under the BSC. When the measurement results of a plurality of mobile stations are monitored, a dedicated counter 43 is required for each MS. The handover control unit 41 uses these registers and counters in accordance with the invention in making a handover decision in a mobile communication system of multilayer radio coverage, as will be described below.

FIG. 3 illustrates in process steps the processing of measurement results reported by one MS for one microcell (A, B or C). The measurement results reported by the MS are, for example, in accordance with the prior art described above. A measurement result may represent, for instance, the received power, bit error ratio, or a combination thereof. The counter 43 of the microcell is initialized, i.e. reset to its initial value 0 (step 32), if the MS is handed over to the base station of the macrocell or if the MS sets up a call in the macrocell (step 31). In step 33, a single measurement result received after a substantially regular interval is compared with a threshold level T in register 42. Measurement results that are below or equal to the pre-set signal threshold level T or that are completely missing are classified as unacceptable results. Such measurement results decrement the counter 43, or the value of relative speed, by a pre-set decrement step (step 36). However, the counter value in counter 43 never becomes negative; this is ensured in step 35. Measurement results above the threshold level T are classified as acceptable. Acceptable measurement results increment the counter 43, or the value of relative speed, by a pre-set increment step (step 34).

The threshold level T with which the measurement results are compared may be set by the operator of the mobile communication network. A separate threshold level T may be set for each base station. The signal threshold level T is expressed as signal level and/or quality in accordance with the measurement results to be compared. The threshold level T is preferably proportional to the diameter of the area covered by the microcell and to the transmission power of the base station.

In step 37 of FIG. 3, the counter value in counter 43 is compared with a pre-set threshold value N obtained from register 42. When the counter value in counter 43 exceeds the threshold value N, the MS is concluded to move at a sufficiently slow speed within the area of the microcell in question (step 38). The network elements making handover decisions are informed of the relatively slow speed of the MS. The selection of a suitable target cell can be based on the signal level of a base station, the difference between the signal levels of the serving cell and a neighbouring cell, or on some other appropriate criterion.

The threshold value N may be set by the operator, and it may be set separately for each microcell. The threshold value N is preferably proportional to the diameter of the area covered by the microcell and to the maximum speed of a slow moving mobile station.

Figure 5:
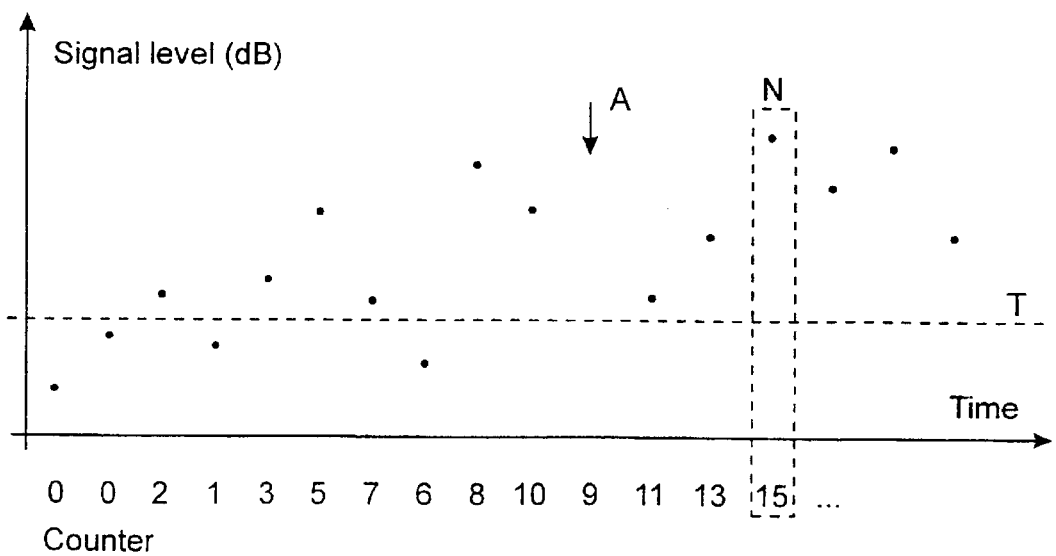
FIG. 5 illustrates an embodiment of the operation of a counter suitable for implementing the method of the invention.

FIG. 5 illustrates the operation of a counter 43 in an embodiment of the method of the invention. The vertical axis represents the signal level of measurement results in dBm units as a function of time represented by the horizontal axis. The threshold level T of the measurement results is indicated in FIG. 5 by a horizontal broken line. The threshold level T may be, for example, −95 dBm. Measurement results which are above the threshold level T are acceptable. Measurement results which remain below the threshold level T or are completely missing are unacceptable. The value registered in the counter 43 after each measurement result is indicated below the horizontal axis. It can be seen from FIG. 5 that measurement results are normally received at regular intervals, in this case at intervals of 480 ms. In the example of FIG. 5, arrow A indicates a missing measurement result. The measurement result may be missing because of a shadow region in the radio coverage, for example, or if the measured base station does not instantaneously belong to the six best base stations.

In FIG. 5, the counter value in counter 43 is initially 0, in which case, unacceptable measurement results do not yet change the counter value. In this example, acceptable measurement results increment the counter value in the counter 43 by two, whereas unacceptable measurement results decrement it by one. This appears clearly from FIG. 5. at the third measurement result the value of the counter 43 decreases to 2, and at the fourth measurement result the value of the counter 43 becomes 1. The missing measurement result indicated by arrow A decrements the value of the counter 43 by one in this case, i.e. from 10 to 9. When the value of the counter 43 exceeds a pre-set threshold value N, the MS is defined as slow moving, i.e. it is preferably handed over to the base station BTS of the microcell (A, B or C). In the case of FIG. 5, the threshold value N is 15.

Mobile stations MS moving at a fast speed across the coverage area of the microcell move outside the microcell before the value of the counter 43 exceeds the pre-set threshold value N. Since measurement results measured outside the coverage area of the microcell are classified as unacceptable, i.e. they are below the threshold level T or completely missing from the reported measurement results, they decrement the value of the counter 43. Interpretation of a fast moving MS as a slow moving one is thus prevented even if the MS should return to the area of the same microcell after a while.

The value of the decrement step by which the value of the counter 43 is decremented at an unacceptable measurement result, and the value of the increment step by which the value of the counter 43 is incremented at an acceptable measurement result can be freely set by the operator. The value of the counter increment step is preferably greater than or equal to the value of the decrement step, in which case the significance of unacceptable measurement results is not too much emphasized. The values of the increment and decrement steps to be set depend on the threshold value N of the counter 43.

In the above, the method of the invention has been described by means of a preferred embodiment. In this embodiment, the measurement results are classified into two classes. In other embodiments of the invention there may be more classes, in which case the measurement results are compared with several threshold levels and classified on the basis of this comparison. In this case it is also possible to define a dedicated increment or decrement step for each class.

The drawings and the associated description are intended merely to illustrate the inventive concept. In its details the method of the invention for making a handover decision in a mobile communication system of multilayer radio coverage may be modified within the scope of the appended claims.

What is claimed is:

1. A method for making a handover decision in a mobile communication system comprising at least one microcell, the coverage area of which is at least mainly located within the coverage area of a another cell, said method comprising measuring at a mobile station a signal strength of a radio signal transmitted by a base station of a microcell, and reporting the a signal strength measurement results at substantially regular intervals to the mobile communication system, comparing each of said reported signal strength measurement results with a preset signal threshold level, classifying each of said signal strength measurement results above the threshold level as acceptable and each of said signal strength measurement results below the threshold level or are missing measurement results as unacceptable, determining a relative speed for the mobile station on the basis of a relative number of the measurement results classified as acceptable and unacceptable, defining a mobile station as a slow moving mobile station, when the determined relative speed of said mobile station is lower than a predetermined relative speed, and commanding mobile stations defined as slow moving mobile stations to switch to the, base station of a suitable microcell.

2. A method according to claim 1 comprising expressing the signal threshold level as the signal level.

3. A method according to claim 1, wherein said steps of determining and defining comprises:

incrementing said relative number representing the relative speed by a pre-set increment step when the measurement result is acceptable, decrementing said relative number representing the relative speed by a pre-set decrement step when the measurement result is unacceptable, comparing said relative number representing relative speed with a threshold value representing said predetermined relative speed, and defining a mobile station as slow moving when said relative number representing relative speed exceeds the threshold value.

4. A method according to claim 3, wherein the increment step is greater than or equal to the decrement step.

5. An arrangement for making a handover decision in a mobile communication system comprising at least one microcell the coverage area of which is at least mainly located within the coverage area of another cell, and mobile stations arranged to measure a signal strength of a radio signal transmitted by a base station of at least one microcell and to report the signal strength measurement result at substantially regular intervals, said arrangement comprising:

first comparison means for classifying the signal strength measurement results received from a mobile station at substantially regular intervals for the base station of each microcell, by classifying each of said signal strength measurement results above the pre-set signal threshold level as a acceptable and each of said signal strength measurement results below the threshold level or are missing measurement results as unacceptable;

counter means for determining a relative speed of the mobile station by counting a relative number of the signal strength measurement results classified as acceptable and unacceptable for the base station of each microcell and second comparison means for comparing the relative speed of the mobile station with a pre-set threshold value and when the threshold value is exceeded, defining the mobile station as a slow moving mobile station, and means for commanding a mobile station defined as a slow moving mobile station to switch to the base station of a suitable microcell.

6. An arrangement according to claim 5, wherein said comparison means, counter means, second comparison means and said commanding means are placed in association with the elements of the mobile communication system which make handover decisions.

7. An arrangement according to claim 5, wherein the counter means are arranged to increment the value representing the relative speed by a pre-set increment step at an acceptable measurement result, and to decrement the value representing the relative speed by a pre-set decrement step at an unacceptable measurement result.

8. A method according to claim 2, characterized by incrementing the value representing the relative speed by a pre-set increment step when the measurement result is acceptable, decrementing the value representing the relative speed by a pre-set decrement step when the measurement result is unacceptable, comparing the value representing relative speed with a threshold value (N), and defining a mobile station (MS) as slow moving when the value representing relative speed exceeds the threshold value (N).

9. A method according to claim 8, characterized in that the increment step is greater than or equal to the decrement step.

10. An arrangement according to claim 6, characterized in that the first comparison means are arranged to classify measurement results above the pre-set signal threshold level (T) as acceptable and measurement results below the threshold level(T) or missing measurement results as unacceptable.

11. An arrangement according to claim 10, characterized in that the counter means are arranged to increment the value representing the relative speed by a pre-set increment step at an acceptable measurement result, and to decrement the value representing the relative speed by a pre-set decrement step at an unacceptable measurement result.

* * * * *